Oct. 3, 1961          V. S. NATURALE          3,002,492
ANIMAL CAGE LID
Filed Jan. 4, 1960          2 Sheets-Sheet 1
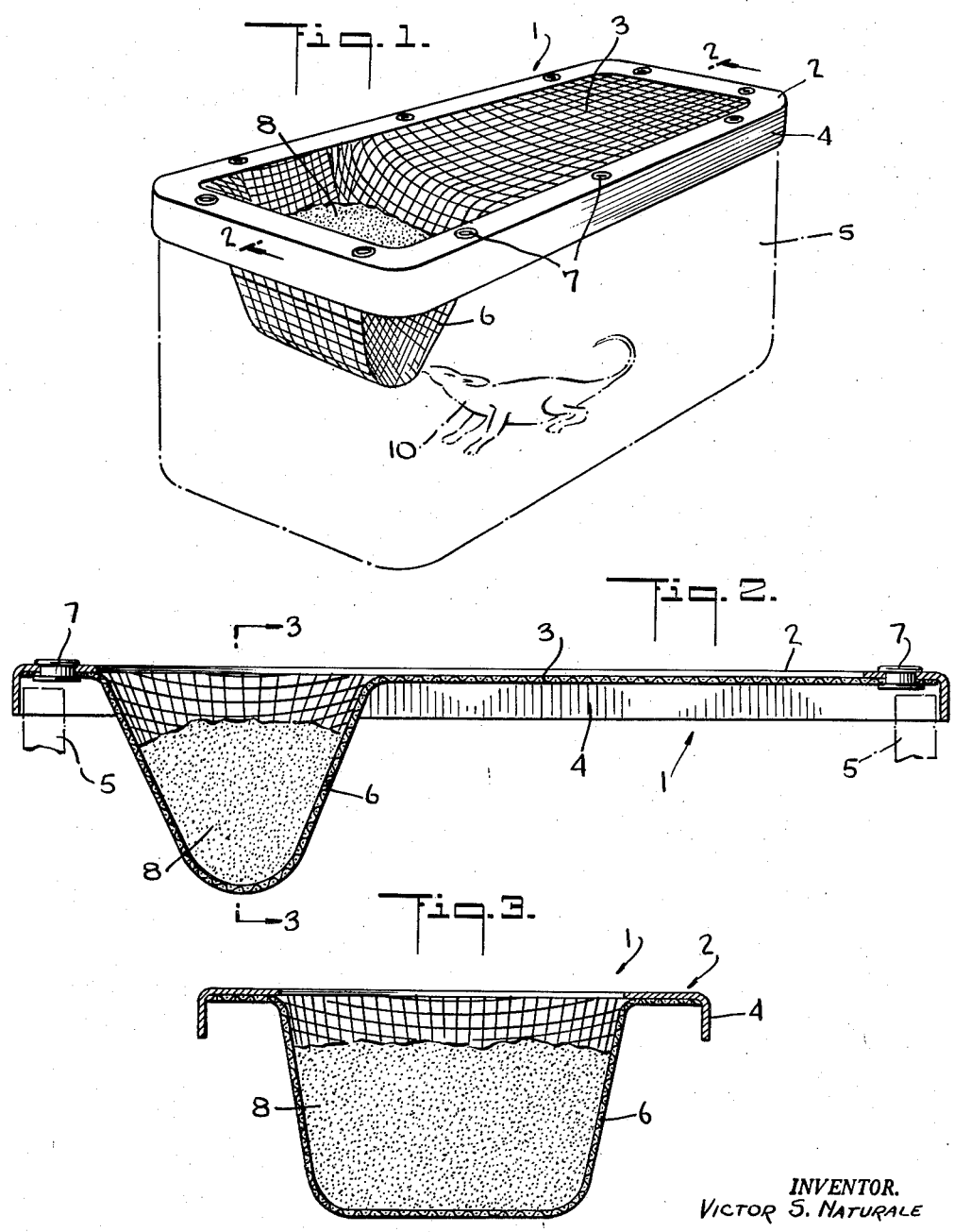
INVENTOR.
VICTOR S. NATURALE
BY
ATTORNEY

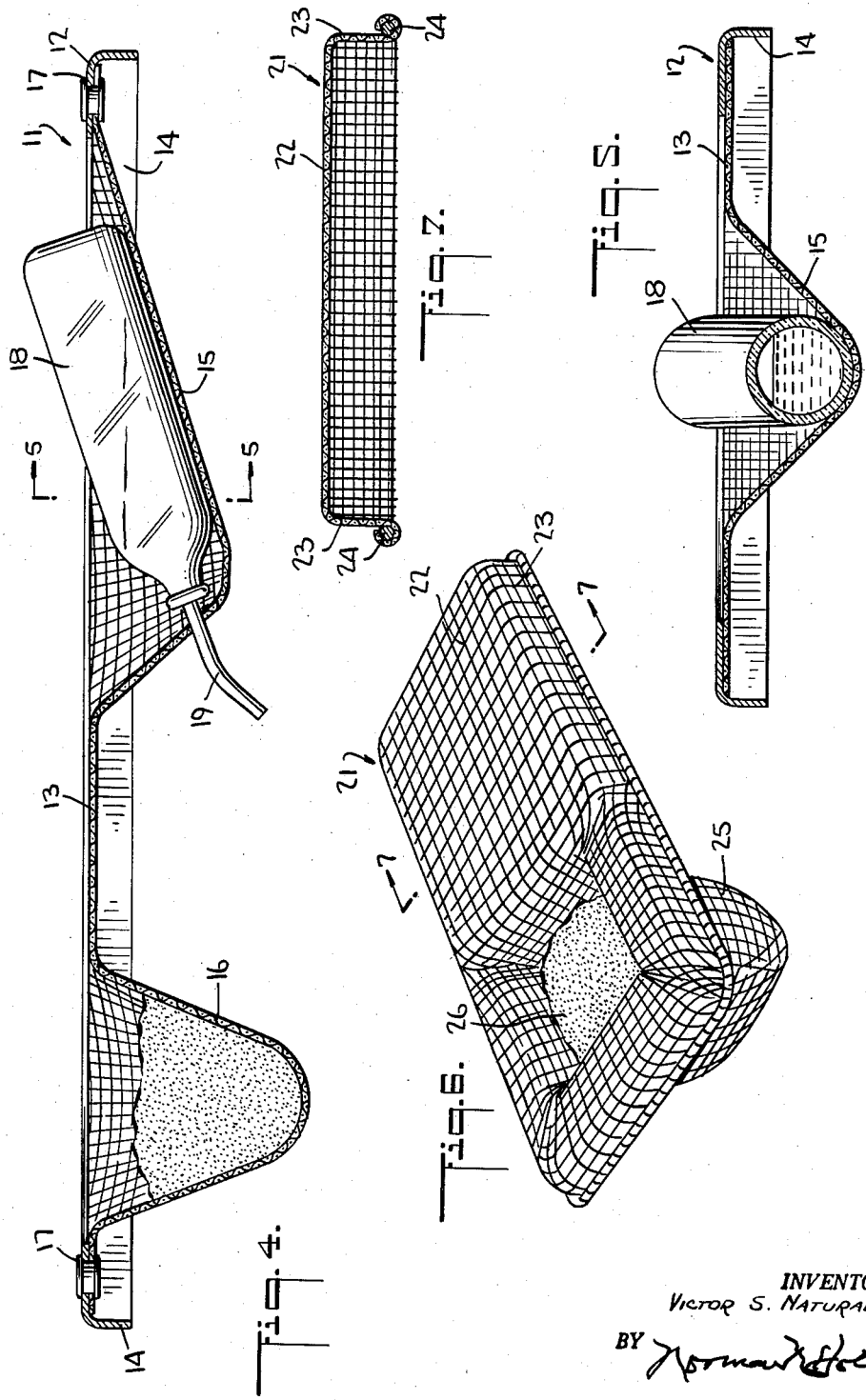

United States Patent Office 3,002,492
Patented Oct. 3, 1961

3,002,492
ANIMAL CAGE LID
Victor S. Naturale, Hillside, N.J., assignor, by direct and mesne assignments, of one-half to Lincoln Mold and Die Corp., East Orange, N.J., a corporation of New Jersey, and one-half to Maryland Plastics Incorporated, Federalsburg, Md., a corporation of Maryland
Filed Jan. 4, 1960, Ser. No. 286
4 Claims. (Cl. 119—18)

The present invention relates to an improved animal cage, and more particularly to an improved lid for an animal cage.

Experimental animals are usually kept in special cages in laboratories so that their reactions to certain experiments may be observed. The cages are provided with suitable feed baskets for solid food so that animals may feed therefrom and are also provided with means for supplying water to the cage.

Heretofore in the prior art, the lids of such animal cages have been manufactured separately from the feed baskets and the holder for water containers. This necessitates the assembly of the several parts together to form the lid. Obviously, this need for assembling the component parts together is time-consuming and expensive. Also, the use of several components to make up the lid does not provide for a sturdy structure.

Furthermore, some of the lids shown in the prior art have been made from a solid sheet of material in which holes have been punched. However, it has been found that this structure does not provide adequate circulation of air.

The present invention overcomes these difficulties and has for one of its objects an improved lid for an animal cage in which the feed basket is integral with the lid so that both the lid and the feed basket are made in a single operation.

Another object of the present invention is to provide an improved lid for an animal cage which will be open to provide adequate circulation of air.

Another object of the present invention is to provide a lid for an animal cage in which a water container holder is integrally formed with the lid.

Another object of the present invention is to provide an improved animal cage lid which is inexpensive to manufacture and which may be manufactured in a single operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the animal cage lid of the present invention showing its position when it is mounted on an animal cage;

FIG. 2 is a sectional view taken along the line 2—2 of FIG. 1;

FIG. 3 is a sectional view taken along the line 3—3 of FIG. 2;

FIG. 4 is a sectional view of a modification of the animal cage lid shown in FIG. 1;

FIG. 5 is a sectional view taken along the line 5—5 of FIG. 4 showing the position of the water feed holder on the lid;

FIG. 6 is a sectional view of another modification of the animal cage lid of the present invention; and FIG. 7 is a sectional view taken along the line 7—7 of FIG. 6.

Referring to the drawings and more particularly to FIGS. 1 to 3, the lid 1 of the present invention comprises a rim 2 made of plastic or other suitable material to which is attached a cover portion 3. The rim has a depending skirt portion 4 which permits the lid 1 to be mounted on an animal cage 5 (shown in dotted lines in FIGS. 1 and 2) and to be held in place on the animal cage 5.

The cover portion 3 is preferably formed from open deformable material, such as the wire mesh material shown in the drawing, so that it can be easily worked to the desired shape. The fact that the cover portion 3 and its integrally formed basket 6 are made from wire mesh or from any other suitable open material provides for adequate circulation of air.

Cover portion 3 has a feed basket 6 depending therefrom. The feed basket 6 is shown as integrally formed with the cover portion 3 and as being located at one end of the cover portion 3 and in a transverse position with respect to the longitudinal axis of the lid 1, however it will be understood that the feed basket may be located in any part of the cover portion 3 and that it may assume any desired position.

In assembly, the cover 3 and the feed basket 6 are formed in a single operation from a single piece of wire mesh so that the basket 6 is integrally formed with the cover to give a sturdier structure. The cover portion 3 is then assembled to the rim 2 by any suitable attaching means, such as the eyelets 7 shown in the drawings, to complete the lid 1.

In operation, the lid 1 is first mounted on the cage 5. Solid food 8 is placed in the feed basket 6. The spacing between the wires of the wire mesh basket 6 is such that the animal 10 may remove particles of food 8 from the feed basket 6 when it is feeding. Also, the openings in the cover portion 3 permit the tube of a water container (not shown) to be inserted through any suitable convenient opening in the cover portion 3 as may be desired.

Referring now more particularly to FIGS. 4 and 5, a modification of the present invention is shown. The lid 11 has a rim 12 having a depending peripheral skirt portion 14 and a wire mesh cover portion 13 attached thereto by eyelets 17, in a manner similar to that shown in FIGS. 1 to 3. A feed basket 16 is integrally formed with the cover portion 13, as described above.

The cover portion 13 also has a depending integrally formed holder 15 for a liquid or water container 18 shown in the drawing in the form of a bottle having a feed tube 19 extending through the opening in the wire mesh cover 13. With this structure, the animals may feed on solid particles of food from the feed basket 16 and may obtain water from the water container 18 through the feed tube 19.

The holder 15 for the water container 18 is shown as being located along the central axis of the cover portion 13. However, it will be understood that the location of holder 15 may be changed, as may be desired. The holder 15 for the water container 18 is formed in a single operation with the cover portion 13 and the feed basket 16.

Referring now to FIGS. 6 and 7, another modification of the present invention is shown. In this embodiment the lid 21 is made completely from a wire mesh material. The cover portion 22 has an integral depending skirt portion 23. The lower edge of the skirt portion 23 is curled around, or otherwise mounted on, a peripherally extending wire support 24 to give the lid 21 strength. The cover portion 22 has an integrally formed feed basket 25 to receive food 26. In this embodiment, the cover portion 22, the feed basket 25 and the skirt portion 23 may be made in a single operation, thereby facilitating further the manufacture of the lid 21. It will be understood that the lid shown in FIGS. 6 and 7 may also be provided with an integral holder for a liquid receptacle similar to the holder 15 shown in FIGS. 4 and 5.

It will be seen that the present invention provides an improved animal cage lid which may be made in a single operation and which provides for an integral feed basket and an integral holder for a water container. The present invention also provides an improved animal cage lid which is sturdy in construction and at the same time adequate circulation of air is provided.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An animal cage lid comprising an oblong cover portion made of a wire mesh material and a depressed feed basket depending therefrom at one end thereof, said feed basket being integral with said cover portion and extending substantially for the full width of said cover portion, and said basket being normal to the longitudinal axis of said cover portion.

2. An animal cage lid as claimed in claim 1, wherein said cover portion is mounted on a rim having a skirt portion depending therefrom.

3. An animal cage lid as claimed in claim 1, wherein said cover portion is provided with a depressed holder for a container integral with said cover portion and substantially on the longitudinal axes thereof.

4. An animal cage lid as claimed in claim 1, wherein said cover portion has an integrally formed peripheral skirt portion depending therefrom.

References Cited in the file of this patent

UNITED STATES PATENTS 2,467,525    Fricke _____ Apr. 19, 1949

FOREIGN PATENTS 682,198    Great Britain _____ Nov. 5, 1952